United States Patent [19]

Dehm et al.

[11] Patent Number: 4,496,708

[45] Date of Patent: Jan. 29, 1985

[54] WATER-SOLUBLE POLYURETHANE COMB POLYMER PRODUCTION

[75] Inventors: David C. Dehm, Thornton, Pa.; Kenneth L. Hoy, St. Albans; Richard C. Hoy, South Charleston, both of W. Va.

[73] Assignee: Union Carbide Corporation, Danbury, Conn.

[21] Appl. No.: 561,472

[22] Filed: Dec. 14, 1983

[51] Int. Cl.$^3$ ............................................. C08G 18/48
[52] U.S. Cl. ........................................ 528/76; 528/77
[58] Field of Search .................................... 528/76, 77

[56] References Cited

U.S. PATENT DOCUMENTS

| 3,779,970 | 12/1973 | Evani et al. | 524/549 |
| 3,794,608 | 2/1974 | Evani et al. | 524/549 |
| 4,079,028 | 3/1978 | Emmons et al. | 528/49 |
| 4,138,381 | 2/1979 | Chang et al. | 526/210 |
| 4,167,502 | 9/1979 | Lewis et al. | 526/317 |
| 4,169,818 | 10/1979 | DeMartino | 252/8.5 R |
| 4,209,333 | 6/1980 | Ong et al. | 106/25 |
| 4,230,844 | 10/1980 | Chang et al. | 526/210 |
| 4,268,641 | 5/1981 | Koenig et al. | 525/367 |
| 4,426,485 | 1/1984 | Hoy et al. | 524/591 |

Primary Examiner—Maurice L. Welsh
Attorney, Agent, or Firm—Henry H. Gibson

[57] ABSTRACT

Water soluble polyurethanes, having hydrophilic polyether backbone and pendant monovalent hydrophobic groups of sufficient size and number while establishing proper hydrophilic/lipophilic balance, provide improved thickening of aqueous systems.

24 Claims, No Drawings

WATER-SOLUBLE POLYURETHANE COMB POLYMER PRODUCTION

BACKGROUND OF THE INVENTION

1. Field of the Invention

This invention relates to water-soluble, polyurethane comb polymers effective in thickening aqueous systems.

2. Description of the Prior Art

There are several basic theories by which water-soluble polymers are believed to thicken aqueous systems such as waterborne coatings and latex paints. The theory of "Chain Entanglement" requires the polymer to have a very high molecular weight which in solution translates to an extremely large hydrodynamic volume. The thickening occurs because the long, solvated polymer chains comingle with one another producing "chain entanglements." The salient points of this model are (a) there is no interaction of the water soluble thickener polymer chains with the latex particles; (b) under shear conditions, the water-soluble thickener polymer chains orient or are visco-elastically deformed resulting in a lowered viscosity (shear thinning); and (c) upon removal of the shear the visco-elastic polymer chains recover immediately resulting in very poor flow and leveling properties for the aqueous system. It is believed that the more established thickeners, i.e., the traditional cellulosics, natural gums, and very high molecular weight, synthetic, water-soluble polymers achieve their thickening effects by this "chain entanglement" mechanism.

Another theory of thickening in aqueous systems can be called "Particle Bridging" or "Association Thickening." This theory is proposed by coating technologists of the Dow Chemical Company to explain the thickening action which occurs in latexes and waterborne coatings by certain synthetic thickeners. The Particle Bridging theory is described in a pamphlet entitled "ELT Experimental Liquid Thickeners XD-30255.02L and XD-30457.02L" distributed by the Dow Chemical Company.

The Particle Bridging theory is offered to account for the thickening properties of relatively low molecular weight synthetic thickeners described in a series of patents including U.S. Pat. No. 3,779,970 (Evani I) that describe polymers which are composed of two different segments: (1) the backbone of the polymer, which is water-soluble, and (2) long polyalkylene oxide branches each terminated by a hydrophobic moiety. The long branches are attached to the polymer backbone much like the teeth of a comb to the comb's backbone, such that these polymers are characterized as "comb polymers". The combination of the polyalkylene oxide branches terminated by the hydrophobic moieties provides the polymer with certain qualities of a surfactant. Consequently, the thickening action of these comb polymers is suggested to be by particle-to-particle bridging in which the hydrophobic moiety terminating the individual teeth of the copolymer is postulated to adsorb at the latex particle surface much in the nature of a surfactant. Since there is a plurality of teeth on each polymer backbone, simultaneous interaction of a single polymer molecule with two or more particles can create an apparent three-dimensional network. This pseudo-network is considered to account for a viscosity increase. The important aspects of the particle bridging theory are (a) a specific interaction, i.e., adsorption, is required of the surfactant tooth at the particle surface; being that, it is assumed that the hydrophobic tooth moiety displaces the stabilizing surfactant or colloid already present on the surface of the particle; (b) under a shear field or shear inducement, the bridged particles of the latex are mechanically separated causing the adsorbed tooth-like moieties to be wrested from the surface, i.e., desorbed such that there is a viscosity decrease (shear thinning); and (c) upon removal of the shear force, the recovery is diffusion controlled and governed by the rate of readsorption resulting in a viscosity increase at a relatively controlled rate so as to achieve good flow and leveling properties. The polymers of these structures are indicated to exhibit a better rheology than those which operate by the "chain entanglement" mechanism. Such polymers are alleged to provide much better flow and leveling characteristics to waterborne coatings and latex systems than do the traditional cellulosic thickening agents.

In relying upon the Particle Bridging theory one has to stress the criticality of the total polymeric molecular structure because in order to have the hydrophobic moiety adsorb on the latex particle surface, the hydrophobic moiety must be chemically attached to a hydrophilic moiety of a type which allows particle adsorption and displacement of the surface active agent or colloid which is already present on the particle surface. In particular, U.S. Pat. No. 3,779,970 (Evani I) discloses at column 1, lines 51 to 59 that "It is important to the invention that the esterifying moiety be a monohydroxyl containing nonionic surfactant and that the hydrophobic group of the surfactant be spaced apart from the polymer backbone by a hydrophilic polyethylene oxide (polyoxyethylene) chain having at least about 10 oxyethylene units in the chain. In addition, the nonionic surfactant should have an HLB of at least about 12, preferably 14." It is also disclosed at column 4, lines 23 to 28, that "it is believed that the nature of the hydrophobic group of the surfactant and the distance by which it is separated from the backbone of the polymeric material are important in providing the improved flow and leveling properties as well as thickening power to the latex paint." In addition, U.S. Pat. No. 3,794,608 (Evani II) discloses polymer backbones containing nonionic or anionic hydrophilic comonomers which must be balanced in a particular fashion to produce optimum performance of the thickener polymer, as discussed in Evani II at column 3, lines 17 to 25.

Additional patents disclosing random type polymers containing bound surfactants, or other copolymers having a random configuration of hydrophobic groups, include U.S. Pat. No. 4,167,502 (Lewis et al.); U.S. Pat. No. 4,169,818 (DeMartino); U.S. Pat. No. 4,230,844 (Chang I); U.S. Pat. No. 4,268,641 (Koenig et al.); U.S. Pat. No. 4,138,381 (Chang II); European patent application publication No. 13,836 (Chang III) which discloses a hydrophobe poor environment, by describing at page 10, lines 17–19, that the thickening property of the polymer reaches a maximum as surfactant is added; and European patent application publication No. 11,806 (Sonnebend) which discloses at page 11, lines 7–11 that "it is critical to the performance of these products that they contain an effective amount of an in situ, bound surfactant to control the rheology of the aqueous systems thickened with the solubilized emulsion polymer" and is therefore similar to the Evani patents in relying on total polymeric structures.

Another procedure for arranging hydrophobic groups is disclosed in U.S. Pat. No. 4,079,028 (Emmons et al.). Polyurethane polymers are disclosed having hydrophobic groups capping a hydrophilic polyether polymer backbone. Although it is disclosed at column 7, lines 33 to 41 that the polymers "thicken by an associative mechanism such as micellar or other form of association" Emmons et al. at column 14, lines 14 to 28, disclose that terminal monovalent hydrophobic groups are desired. It is disclosed, at column 14, lines 66–68 that these polymer structures are useable for thickening water alone. Another patent of general interest in this area is U.S. Pat. No. 4,209,333 (Ong et al.) which discloses star-shaped polymers using an ester linkage for hydrophobe attachment, in place of a urethane linkage as described in Emmons et al.

Other patents of interest in this general area include: (1) U.S. Pat. No. 3,970,606 (Field et al.) which discloses random interpolymers of N-vinyllactam or acrylamide, hydrophobic group containing vinyl comonomers and a cationic moiety. The patent suggests in Table V at Columns 7 and 8 that as the content of the hydrophobe containing monomer is varied from 0.8 mole % to 9.1 mole %, the thickening efficiency of the polymer is altered only slightly. (2) U.S. Pat. No. 4,228,277 (Landoll I) discloses water-soluble, substituted cellulose ethers modified with $C_{10}$ to $C_{24}$ alkyl groups and is of interest in disclosing at column 7, lines 57 to 62, that "the behavior of the modified polymers in exhibiting surface activity, as well as their rheological character, suggest that the long chain modified molecules are aggregated into micelle-like clusters in aqueous solution much as is known to happen in the case of more conventional surfactants." As such Landoll I is disclosing that the entire polymer backbone is involved in micelle formation. Similar to the Particle Bridging Theory, Landoll I discloses at column 8, lines 2 to 5 that "surface activity is also noticeable to a significant degree with latex paints where the long-chain alkyl substituted products show a tendency to adsorb on non-polar latex particles." Landoll I also includes a disclosure at column 2, lines 62 to 65 that a uniform presence of hydrophobic groups is required to achieve thickening. Furthermore, it is disclosed at column 8, lines 6 to 16 that viscosity increases with the addition of free surfactant, which exemplifies hydrophobic poor structures. (3) Another patent of general interest is U.S. Pat. No. 4,304,902 (Landoll II) which discloses random copolymers of ethylene oxide and long chain epoxides.

SUMMARY OF THE INVENTION

The present invention relates to a water-soluble polyurethane comb polymer containing repeating units which are the residues of an organic polyisocyanate, polyethylene glycol homopolymer or copolymer and a hydrophobe reactant. The hydrophobe reactant contains a monovalent hydrophobic group providing a molar volume contribution of at least about 130 cc/mole. Sufficient residues are provided to establish a molecular weight of at least about 10,000. The polymer is characterized by having at least one residue of hydrophobic reactant separated from each end of the polymer by at least one residue of the polyethylene glycol. The polymer is further characterized by having a hydrophilic/lipophilic balance of between about 14 to about 19.5.

A process for producing the urethane comb polymer is also provided which comprises reacting the organic polyisocyanate, polyethylene glycol, and hydrophobe reactant either simultaneously or sequentially in a manner sufficient to produce the above-designated comb polymer.

DETAILED DESCRIPTION OF THE INVENTION

It has been discovered that good thickening and leveling properties in aqueous coatings can be achieved by using polyurethane comb polymers. The comb polymers have sufficient hydrophilic polyether backbone balanced with pendant monovalent hydrophobic groups, hereinafter referred to as hydrophobes, to establish a proper hydrophilic/lipophilic balance. The comb polymers are further provided with hydrophobes of sufficient size and number to provide enhanced thickening of aqueous systems.

These comb polymers are believed to function by providing micellar associations based on the Micellar Bridging theory described in copending U.S. patent application Ser. No. 388,202, filed June 14, 1982, now U.S. Pat. No. 4,426,482 (Hoy et al.) which is incorporated herein by reference. In contrast to that application, the present invention resides in the discovery that such micellar association can be achieved using single hydrophobes provided with sufficient molar volume contribution to enable the formation of micellar associations.

The Micellar Bridging theory is based upon the existence within the aqueous phase of intermolecular, micelle-like associations between the hydrophobes bonded to the water-soluble polymer. In the broadest characterization the term "micelle-like association" is intended to mean the approximate aggregation of at least two hydrophobes serving to exclude water at that proximity. Micelle-like association can be looked at as a congregation of hydrophobes which locally excludes water. These micelle-like associations are dynamic, molecular, hydrophobic association, which occur in aqueous solution. These associations occur only in abundance above a critical concentration, i.e., the critical micelle concentration, CMC. CMC can be defined as the amount of hydrophobe containing compound which is required to saturate a solution at standard conditions, such that the addition of any more hydrophobe containing compound will produce a phase separation on a molecular level, resulting in the formation of micelle-like associations. As such, at a concentration above the CMC, the amount of free hydrophobe containing compound, i.e., having unassociated hydrophobes, in solution will not increase. The time averaged, i.e., equilibrium, number and size of micelle-like associations are constant at constant conditions, such as temperature, concentration, ionic strength and the like. The duration of time that an individual micelle-like association exists is related to the (1) chemical potential of the hydrophobic moiety as compared to its (aqueous) environment and (2) steric factors, such as the proximity of one hydrophobic group to another, which aid and abet the approach of two or more hydrophobic moieties to each other. The chemical potential of the hydrophobic moiety, $\Delta\mu$, can be roughly estimated by the equation:

$$\Delta\mu = 2RT - \frac{V_s + V_p}{2}(\delta_s - \delta_p)^2 x^2 \qquad (I)$$

wherein R is the universal gas constant; T is temperature in degrees Kelvin; $V_s$ and $V_p$ are the molar volumes of the solvent (water) and the hydrophobic moiety respectively; $\delta_s$ and $\delta_p$ are the solubility parameters of the solvent (water) and hydrophobic moiety respectively; and x is the volume fraction concentration of hydrophobic moiety present. This chemical potential equation can be deduced from the theory of the solubility of liquids in liquids as presented in *The Solubility of Non-Electrolytes*, by J. H. Hildebrand and R. L. Scott at page 253, published by Dover Publication, Inc., New York, N.Y. (1964). The more negative the value of $\Delta\mu$, the stronger the propensity to form and maintain micelle-like associations. Thus, strong hydrophobic associations are possible where there is a large disparity between the molar volumes of the solvent (water) and the hydrophobe, as well as a large difference between the solubility parameters. Weak associations occur when only slight differences between these two factors exist. When the chemical potential is zero or positive, aggregation by hydrophobic association, i.e., micelle-like association, is not expected and the system is below critical micelle concentration, CMC. Indeed under such conditions materials should be mutually soluble.

The novel polymers of this invention provide a unique thickening capability in aqueous systems which is believed to stem from the unique arrangement of the hydrophobes interbonded to the water-soluble backbone. These hydrophobes have the ability to readily form micelle-like associations in water, with hydrophobes from other molecules of the polymer. Because the micelle-like associations interconnect a number of polymers, there is a build-up of interlocking water-soluble polymer backbones achieved through this micelle-like association. Such interlocking of hydrophobes in micelle-like associations, by "micellar bridging" causes a dramatic increase in the apparent molecular weight of the polymer resulting in an increased viscosity of the aqueous medium.

The implication of the Micellar Bridging theory is that the particular structure of the polymeric backbone which generates water-solubility is not critical to the performance of the polymer in the thickening operation other than providing a hydrophilic quality to the molecule. What is critical is the placement of the hydrophobes in the polymer so as to enhance bridging of polymer chain to polymer chain thereby achieving enhanced thickening in aqueous systems.

The polymer will preferably contain from about 2 to 25 hydrophobes and most preferably from about 4 to about 11 hydrophobes per molecule. The number of hydrophobes is not critical so long as a sufficient size and number are provided to enable the generation of intermolecular, micelle-like associations when the polymer is in aqueous solution, but while maintaining a proper hydrophobic/lipophilic balance.

It is to be understood that the benefits of this invention can be achieved in many cases by a relatively low concentration of polymer molecules which contain sufficient hydrophobes of this invention in mixtures with polymer molecules which do not contain such hydrophobes.

The composition of the hydrophobic reactants from which the hydrophobes are derived is not critical so long as the hydrophobes provide a molar volume contribution of greater than about 130 cubic centimeters per mole, and preferably greater than about 190 cubic centimeters per mole, and having a nominal contribution to the calculated solubility parameter of less than about 9.5 (cal./cc)$^{\frac{1}{2}}$, and preferably from about 6.5 to about 8.5 (calc./cc)$^{\frac{1}{2}}$. The molar volume and solubility contributions of various hydrophobes are readily estimated from their structure using methods well described in the literature, as in "New Values of the Solubility Parameter from Vapor Pressure Data", by K. L. Hoy, *Journal of Paint Technology*, Volume 482, 116 (1970); "Solubility Parameters for Film Formers", by H. Budell, *Official Digest*, 726 (1955); "Molar Volume Additivity of Polymers", by R. Kawai, *Chemistry of High Polymers*, (Japan), Volume 13, Page 139 and 147 (1956); and *Properties of Polymers*, by D. W. Van Krevelan Elsevier/North-Holland, Inc., New York, N.Y., Chapter 7, 129 (1976).

Some preferred hydrophobes include: alkyl, cycloalkyl, aryl, alkaryl, aralkyl hydrocarbons having 8 or more carbon atoms; fluoro substituted alkyl, cycloalkyl, aryl, alkaryl and aralkyl having 5 or more carbon atoms and at least one fluorine; and organosiloxane containing organic radicals.

Table I sets forth the calculated molar volumes and solubility parameters for various selected hydrophobes.

TABLE I

| CALCULATED MOLAR VOLUMES AND SOLUBILITY PARAMETERS FOR SELECTED HYDROPHOBES | | |
|---|---|---|
| Parameters Hydrophobe | Molar Volume, cc/mole | Solubility (cal/cc)$^{\frac{1}{2}}$ |
| n-octyl | 130.3 | 8.20 |
| perfluorobutylmethyl | 130.6 | 6.69 |
| n-butylphenyls | 136.7 | 8.84 |
| n-nonyl | 145.8 | 8.23 |
| n-pentylphenyls | 152.3 | 8.80 |
| perfluoropentylmethyl | 156.6 | 6.65 |
| n-decyl | 161.3 | 8.25 |
| isohexylphenyls | 161.8 | 8.63 |
| n-hexylphenyls | 167.8 | 8.77 |
| n-undecyl | 176.9 | 8.27 |
| n-heptylphenyls | 183.4 | 8.74 |
| lauryl | 192.4 | 8.29 |
| n-octylphenyls | 198.9 | 8.72 |
| isononylphenyls | 208.5 | 8.26 |
| n-nonylphenyls | 214.5 | 8.70 |
| n-tetradecyl | 223.5 | 8.31 |
| n-decylphenyls | 230.0 | 8.68 |
| n-undecylcyclphenyls | 245.6 | 8.67 |
| n-hexadecyl | 254.5 | 8.33 |
| isododecylphenyls | 255.1 | 8.34 |
| n-dodecylphenyls | 261.1 | 8.66 |
| stearyl | 285.6 | 8.35 |
| n-tetradecylphenyls | 292.2 | 8.63 |
| n-hexadecylphenyls | 338.9 | 8.62 |
| isooctadecylphenyls | 348.5 | 8.21 |

The copolymers of the present invention contain the repeating units:

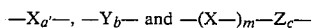

$-X_{a'}-$, $-Y_b-$ and $-(X-)_m-Z_c-$ wherein:

X is the residue of an organic polyisocyanate;

Y is the residue of a polyethylene glycol homopolymer or copolymer with up to 50 mole percent, preferably from 0 to about 25 mole percent, $C_3$ to $C_5$ polyoxyalkylene, preferably polyoxypropylene, or the monomeric equivalent of the polyethylene glycol;

Z is the residue of a hydrophobe reactant containing a monovalent hydrophobic group providing a molar volume contribution of at least about 130 cc/mole, preferably at least about 190 cc/mole;

b is at least about 2, preferably from about 2 to about 100;

c is at least about 2, preferably from about 2 to about 25, and most preferably from about 4 to about 11;

m is 0 or 1;

a' is such that $$\frac{a' + mc}{b + c}$$

is between about 0.50 to about 1.25, preferably from about 0.85 to about 1.05, sufficient to provide a polymer molecular weight of at least about 10,000; and wherein:

(1) the polymer has at least one Z unit separated from each end of the polymer by at least one X unit; and (2) the hydrophilic/lipophilic balance, hereinafter referred to as HLB, of the polymer is between about 14 to about 19.5, preferably between about 16 to about 19.

When m is 0, a' will equal a the number of moles of polyisocyanate provided. When m is 1, a'+mc will equal a.

HLB is a value characterizing the relative proportions of hydrophilic and lipophilic portions of molecules, such as the polyurethane comb polymers of the present invention. It may be calculated, for such non-ionic molecules in which polyethylene oxide is the only hydrophilic portion, by the equation:

$$HLB = 20 \frac{m_h}{(m_h + m_l)} \quad (A)$$

wherein:

$m_h$ is the formula weight of the hydrophilic portion of the molecule: and $m_l$ is the formula weight of the lipophilic portion of the molecule. HLB values can be determined using procedures well known in the art, such as described in Surfactants and Interfacial Phenomena, by Milton J. Rosen, John Wiley and Son, New York, NY, 1978, at page 244.

Preferred comb polymers of the present invention for when m is 1 may be represented by the average formula:

$$HO[(Y—X)_{b-1}Z—X]_cY—OH \quad (II)$$

wherein b' is the average number of polyethylene glycol residues per hydrophobe residue, such that b'×c=b−1, wherein b is the number of moles of polyethylene glycol provided; and c, X, Y and Z are as defined previously. Preferred comb polymers for when m is 0 may be represented by the average formula:

$$HO[(Y_1Z_{c'}Y_2)_{b-1}X]_aY—OH \quad (III)$$

wherein:

a, b, X, Y and Z are as defined previously;

c' is the average number of hydrophobes per polyethylene glycol repeating unit; and $Y_1$ and $Y_2$ are the residue of the polyethylene glycol or its monomeric equivalent reacted with the hydrophobe reactant. Both Formulas (II) and (III) simply represent a statistical average of the molecular structure resulting from the polymerization of the described reactants.

Polymer Preparation

The polymers of the present invention are derived from reactions involving water-soluble monomeric or polymeric reactants, hydrophobic reactants, i.e., compounds containing hydrophobes, and organic polyisocyanates.

The polymers of the present invention may be made by reacting:

(a) a moles of an organic polyisocyanate;

(b) b moles of a polyethylene glycol homopolymer or copolymer with up to 50 mole percent $C_3$ to $C_5$ polyoxyalkylene; and (c) c moles of a hydrophobe reactant containing a monovalent hydrophobic group providing a molar volume contribution of at least about 30 cc/mole wherein:

b is at least about 2;

c is at least about 2; and a is such that $$\frac{a}{b + c}$$

is between about 0.50 to about 1.25 and sufficient to provide a polymer molecular weight of at least about 10,000, and in a manner sufficient to produce said polymer with (1) at least one monovalent hydrophobic group separated from each end of the polymer by at least one polyethylene glycol residue, and (2) an hydrophobic/lipophilic balance of between about 14 to about 19.5.

The organic polyisocyanate is preferably a diisocyanate compound having a structure:

$$O=C=N—R_1—N=C=O \quad (IV)$$

wherein R is an alkylene, cycloalkylene or arylene, either unsubstituted or substituted with groups, such as halo, alkyl and/or aryl. Some representative examples of such compounds include: 2,6- and 2,4-tolylene diisocyanate (i.e., toluene diisocyanate); bis(4-isocyanatophenyl)methane (i.e. methylene dianiline diisocyanate); 1-isocyanato-3-isocyanatomethyl-3,5,5-trimethylcyclohexane (i.e. isophorone diisocyanate); 1,4-tetramethylene diisocyanate; 1,6-hexamethylene diisocyanate; 2,2,4-trimethyl-1,6,diisocyanatohexane; 1,10-decamethylene diisocyanate; 1,4-cyclohexylene diisocyanate; bis(4-isocyanatocyclohexyl)methane; m- and p-phenylene diisocyanate; 4-chloro-1,3-phenylene diisocyanate; 1,5-naphthalene diisocyanate; 1,5-tetrahydronaphthalene diisocyanate; and mixtures thereof. Preferred diisocyanates include toluene diisocyanate, isophorone diisocyanate and methylene dianiline diisocyanate.

The polyethylene glycol homopolymer or copolymer preferably contains the repeating units:

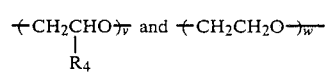

wherein $R_4$ is hydrogen or $C_1$ to $C_3$ alkyl, v is from 0 to about 0.5w, preferably from 0 to about 0.25w, and most preferably is 0; w, is sufficient to provide a molecular weight of at least about 1,000, preferably from about 1,000 to about 14,000. When v is 0 the polyethylene glycol is a homopolymer. When v is greater than 0 the polyethylene glycol is a copolymer which may be either in random or block form. The monomeric equivalent of the polyethylene glycol is comprised of sufficient moles of at least one oxyalkylene glycol of the formula:

$$\underset{\mathrm{HOCH_2CHOH}}{\overset{R_4}{|}} \quad (V)$$

wherein $R_4$ is hydrogen or $C_1$ to $C_3$ alkyl, which provides a polyethylene glycol having the structure as defined above.

The hydrophobe reactant is a compound containing a hydrophobe as previously described. The hydrophobe reactant preferably has the formula:

$$R_2(\text{—CH}_2\text{CHO})_{\overline{n}}Q \quad (VI)$$
$$\phantom{R_2(\text{—CH}_2\text{C}}\overset{R_3}{|}$$

wherein:

n is from 0 to about 40, preferably 0;

$R_2$ is said monovalent hydrophobic group;

each $R_3$ is individually hydrogen or $C_1$ to $C_3$ alkyl; and

Q is a functional group, preferably an alkylene glycol radical such as, $$\underset{\mathrm{-CHCH_2OH,}}{\overset{OH}{|}}$$

or alkenyl radical, such as —CH=CH$_2$, which is reactive with said polyisocyanate or polyethylene glycol.

Some of the specific examples of preferred hydrophobe reactants which can be used to form hydrophobes that can be incorporated into the polymer either pendantly or integrally under the appropriate reaction conditions or sequence of reactions are (1) 1,2 epoxides, such as 1,2 octaneoxide, 1,2 dodeceneoxide, 1,2 hexadeceneoxide and 1,2 octadeceneoxide; (2) alkyl or isoalkyl 1,2 and 1,3 diols, such as: 1,2-octanediol; 1,2-decanediol; 1,2-dodecanediol; 1,2-tetradecanediol; 1,2-hexadecanediol; 1,2-octadecanediol, 1,2-eicosanediol, 1,3-nonanediol; 1H,1H,2H,3H,3H-perfluorononane-1,2-diol: the reaction product of diethylene glycol and an alkyleneoxide such as 1,2-octeneoxide, 1,2-dodeceneoxide, 1,2-hexadeceneoxide, and 1,2-octadeceneoxide, 1H, 1H, 2H, 3H, 3H-perfluorononyleneoxide; the reaction product of lauryl or cetyl alcohols and 1,2-dodeceneoxide or 1,2 hexadeceneoxide; and polyoxyalkylated reaction products of the foregoing compounds, i.e., wherein n is greater than 0; and (3) alkenes, such as: 1-dodecene; 1-tetradecene; and 1-hexadecene.

Most preferred hydrophobe reactants include those containing hydrophobes, i.e., $R_2$ groups as defined in Formula VI, which are an unsubstituted or halo substituted hydrocarbon radical having at least 8, preferably at least 12, and most preferably from about 14 to about 16, carbon atoms. Particularly preferred hydrophobe reactants are nonyphenyl diols (or their corresponding ethoxylated derivatives), 1,2-hexadecanediol, 1,2-octadecanediol and 1,2-hexadecene. Such reactants provide the hydrophobes nonylphenyl, n-tetradecyl or n-hexadecyl, respectively.

The amount of hydrophobic compound which can be added to produce the hydrophobes on the water-soluble polymers may range from about 0.01 to about 10 weight %, more preferably about 0.1 to about 5 weight %, and most preferably from about 0.5 to about 2.5 weight % of the total polymer product.

The amount of polyisocyanate which can be reacted to a polyethylene glycol or hydrophobe reactant may range from about 0.1 to about 10 weight %, more preferably from about 0.5 to about 7 weight %, most preferably from 1.5 to about 4 weight % of the total polymer product.

The relative proportions of polyisocyanate to polyethylene glycol and hydrophobe reactants is between about 0.50 to 1.25, preferably from about 0.85 to about 1.05, moles of isocyanate equivalent to hydroxyl equivalent. For example, between about 0.50 to about 1.25 moles of diisocyanate are provided per mole of polyethylene glycol and hydrophobe diol combined.

Sufficient reactants are provided to produce a polymer molecular weight of at least 10,000, preferably from about 10,000 to about 1,000,000, and most preferably between about 20,000 to 500,000.

The polymers of the present invention may be made by reacting the polyisocyanate, polyethylene glycol and hydrophobe reactant simultaneously or sequentially using the following procedures. Polymers of the type set forth in Formula (II) above, may be produced by either of the following two procedures. One procedure comprises:

(1) reacting a molar excess of the polyisocyanate with the polyethylene glycol to produce a polyethylene glycol diisocyanate intermediate having the formula:

$$O=C=N-X-Y)_{b'}X-N=C=O \quad (VII)$$

wherein b' is the average number of polyethylene glycol residues per molecule, X is the residue of the polyisocyanate and Y is the residue of the polyethylene glycol; followed by (2) reacting the polyethylene glycol intermediate with the hydrophobe reactant to produce the polyurethane having the repeating structure:

$$(\text{—X(—Y—X)}_{\overline{b'}}\text{—CHCH}_2)_{\overline{c}} \quad (VIII)$$
$$\phantom{(\text{—X(—Y—X)}_{\overline{b'}}\text{—C}}\overset{|}{\underset{\underset{R_3}{|}}{\underset{\text{(—OCHCH}_2)_{\overline{n}}R_2}{CH_2}}}$$

wherein b, c, n, $R_2$, $R_3$, X and Y are as defined previously.

Another procedure comprises:

(1) reacting a molar excess of the polyisocyanate with the hydrophobe reactant to produce a hydrophobic diisocyanate intermediate having the formula:

$$O=C=N-X-CHCH_2-X-N=C=O \quad (IX)$$
$$\phantom{O=C=N-X-}\overset{|}{\underset{\underset{R_3}{|}}{\underset{\text{(—OCHCH}_2)_{\overline{n}}R_2}{CH_2}}}$$

wherein:

n, $R_2$ and $R_3$ are as defined previously; and

X is the residue of the polyisocyanate; followed by (2) reacting the hydrophobic diisocyanate intermediate with said polyethylene glycol to produce the polyurethane having the same repeating structure as in Formula VIII.

Homopolymers satisfying Formula (III) above, may be prepared by either of the following two procedures. One procedure involves:

(1) reacting said hydrophobic reactant with (a) said polyethylene glycol or (b) its monomeric equivalent comprised of sufficient moles of at least one oxyalkylene glycol of the formula $$HOCH_2\overset{\underset{\mid}{R_4}}{C}HOH,$$

wherein $R_4$ is hydrogen or $C_1$ to $C_3$ alkyl, to produce b moles a diol intermediate having the formula:

$$HO-Y_3\text{-}(\underset{\underset{\underset{\underset{R_3}{\mid}}{\overset{\mid}{OCHCH_2)_{\overline{n}}R_2}}}{\overset{\mid}{CH_2}}}{\overset{\mid}{CHCH_2O})_{\overline{c}}-Y_4-OH}$$

wherein:
c' is the average number of monovalent hydrophobic groups per diol intermediate;
n, $R_2$ and $R_3$ are as defined previously; and
$Y_3$ and $Y_4$ are the residue of the polyethylene glycol or oxyalkylene reaction; followed by (2) reacting the diol intermediate with the polyisocyanate to produce the polyurethane having the repeating structure:

$$\text{-}(\text{-}(Y_3\text{-}(\underset{\underset{\underset{\underset{R_3}{\mid}}{\overset{\mid}{OCHCH_2)_{\overline{n}}R_2}}}{\overset{\mid}{CH_2}}}{\overset{\mid}{CHCH_2O})_{\overline{c}}-Y_4)_{\overline{b}}X)_{\overline{a}} \quad (X)$$

wherein a, b, c', n, $R_2$, $R_3$, X, $Y_3$ and $Y_4$ are as defined previously. Another procedure comprises:

(1) grafting the hydrophobe reactant onto the polyethylene glycol to produce a diol intermediate having the formula:

$$HO-Y_5\text{-}(\underset{\underset{R_2}{\mid}}{CHCH_2O})_{\overline{c}}Y_6-OH \quad (XI)$$

wherein:
$R_2$ is as defined previously;
c' is the average number of grafts containing said monovalent hydrophobic group, and
$Y_5$ and $Y_6$ are the residue of the polyethylene glycol; followed by (2) reacting the diol intermediate with the polyisocyanate to produce the polyurethane having the repeating structure $$\text{-}(\text{-}(Y_5\text{-}(\underset{\underset{R_2}{\mid}}{CHCH_2O})_{\overline{c}}Y_6)_{\overline{b}}X)_{\overline{a}} \quad (XII)$$

wherein a, b, c', $R_2$, X, $Y_5$ and $Y_6$ are as defined previously.

The temperature during the polymerization reaction may vary. A convenient range is from about 40° C. to about 120° C. preferably from about 60° C. to about 110° C. The reaction temperature should be selected to obtain a reasonably fast reaction rate while avoiding undesirable side reactions, such as allophanate formation. The comb polymer product may be isolated from the reaction medium by procedures well established in the art, including evaporation, distillation, precipitation, filtration and other isolation procedures.

In a typical embodiment, a round bottom reaction flask equipped with a mechanical stirrer, a thermometer, a condenser and a nitrogen purge is charged with the polyethylene glycol, hydrophobe reactant and toluene solvent. The mixture is brought to reflux to azeotropically remove residual water and cooled to 60° C. Catalyst and the polyisocyanate are then added until the reaction mixture becomes viscous after a few hours. Product can then be isolated through the evaporation of solvent at atmospheric conditions.

Adjuvants

Suitable adjuvants may be provided during the formation of comb polymers of the present invention including solvents and catalysts well known to those skilled in the art.

The polymerizaton reaction can be conducted neat or in an aprotic solvent such a toluene or other well known urethane polymerization solvents. Typical catalysts include soluble heavy metal carboxylates, such as phenyl mercuric acetate, bismuth octanoate, dibutyltin dilaurate, and stannous octanoate; tertiary amines, such as bis[2-(N,N-dimethylamino) ethyl ether], triethylamine and triethylenediamine; or any other acidic or basic catalyst well known in the urethane art. A particularly preferred catalyst is dibutyltin dilaurate.

When used in an aqueous solution, the water-soluble, thermoplastic, organic polymer of the present invention is provided in an effective amount to produce thickening of the aqueous solution. An "effective thickening amount" is defined as the quantity of polymer, whether alone or in combination with polymer thickeners of the prior art, required to produce enhanced thickening. Such amount will usually range between about 0.05 to about 15 weight percent, preferably between about 0.1 to about 5 weight percent, and most preferably between about 0.2 to about 2 weight percent of the total composition. Such thickened compositions are useful in a wide variety of applications, such as latex compositions.

EXAMPLES

The following examples are considered to be illustrative only and should not be regarded as limiting the invention.

The chemical designations as used in the examples are defined as follows:

| Designation | Description |
| --- | --- |
| $C_x$ Diol | A 1,2 alkanediol containing a chain of x carbon atoms |
| DBTD | Dibutyltin dilaurate catalyst |
| HLB | Hydrophilic/Lipophilic Balance |
| IPDI | Isophorone diisocyanate |
| MDI | Methylene dianiline diisocyanate |
| NP Diol | $C_9H_{19}\text{-}\phantom{}\text{⌬}\text{-}O\text{-}(CH_2CH_2O)_{\overline{\pi}}CH_2\overset{\underset{\mid}{OH}}{C}HCH_2OH;$ wherein l is 0 |

-continued

| Designation | Description |
|---|---|
| NP-10 Diol | $C_9H_{19}-\langle\bigcirc\rangle-O(CH_2CH_2O)_l CH_2\overset{OH}{\underset{|}{C}}HCH_2OH;$ wherein l is an average of 10 |
| NP-40 Diol | $C_9H_{19}-\langle\bigcirc\rangle-O(CH_2CH_2O)_l CH_2\overset{OH}{\underset{|}{C}}HCH_2OH;$ wherein l is an average of 40. |
| PEG | Polyethylene glycol |
| TDI | Toluene diisocyanate |

EXAMPLES 1–10

These examples demonstrate the preparation of polyurethane comb polymers of the present invention from MDI as organic polyisocyanate, PEG 8000 (a polyethylene glycol having a weight average molecular weight of 7,967 and ethoxylated NP-10 Diol or NP-40 Diol as the hydrophobe reactant, in toluene as solvent.

EXAMPLE 1

40.0 gms. (0.005 moles) of PEG 8000 and 240.0 gms. toluene are heated to reflux to azeotropically remove any water present. The solution is cooled and placed in a graduated addition funnel. 2.5 gms. (0.01 moles) of MDI in 50.0 gms. toluene are charged to a reaction vessel. The material is heated to 50° C. The PEG/toluene solution is added over 2½ hours at 50° C., followed by a rinse with 30.0 gms. toluene and the reaction mixture is heated for approximately 15 minutes. 13.0 gms. (0.005 moles) of NP-40 Diol are provided to the reaction mixture over a period of 1 hour. The reaction is stirred at from 50° to 60° C. overnight. The toluene solvent is stripped off to recover 57.3 gms. product.

EXAMPLE 2

Following procedures similar to those described in Example 1, 80.0 gms. (0.01 moles) of PEG 8000 in 200.0 gms. toluene are charged to a reaction vessel containing 5.0 gms. (0.02 moles) in 60.0 gms. toluene for a period of 1 hour. The reaction mixture is held at 55° C. overnight. 40 gms. of toluene are added and 26.0 gms. (0.012 moles) of NP-10 Diol ethoxylated to a weight average molecular weight of 2,151, in 40.0 gms. toluene, are charged for a period of over 1 hour. The reaction proceeds for 1 hour, followed by the addition of one drop of DBTD catalyst, and the reaction is continued to completion.

EXAMPLE 3

111.5 gms. (0.014 moles) PEG 8000 and 12.2 gms. (0.014 moles) of NP-10 Diol, having a weight average molecular weight of 862, in 210 gms. toluene are heated to reflux to azeotrope off excess water. The mixture is cooled to 50° C. and 5.0 gms. (0.02 moles) of MDI in 30.0 gms. toluene are added dropwise over one hour. One drop of DBTD catalyst is added and the reaction proceeds at 50° C. overnight. Toluene solvent is evaporated off to provide 132.3 gms. product having a cloud point of 84.2° C. A 1% solution of the product is soluble in water with a slight haze.

EXAMPLE 4

115.5 gms. (0.014 moles) of PEG 8000 and 230.0 gms. toluene are azeotroped to remove water, followed by cooling to 50° C. 5.0 gms (0.02 moles) of MDI in 33.0 gms. toluene are added dropwise for over 45 minutes. After one hour reaction time one drop of DBTD catalyst is added followed by 12.2 gms. (0.014 moles) of NP-10 Diol as used in Example 3. After several days reaction at 52° C. the toluene is evaporated off to provide 130.0 gms. of product providing a 1% aqueous solution having a slight haze at room temperature and a cloud point of 90° C.

EXAMPLE 5

The procedure set forth in Example 4 is repeated using those reactants and amounts set forth in Table 2 except that two drops of DBTD catalyst are provided to produce 124.9 gms. of product.

EXAMPLE 6

The experimental procedures of Example 5 are repeated for those reactants and amounts set forth in Table 2, except NP-40 Diol in Example 1 is used in place of the NP-10 Diol, to produce 129.9 gms. of product. The product is water soluble providing a slight haze at room temperature for 1% solution, having a cloud point of 68° C.

EXAMPLE 7

80.0 gms. (0.01 moles) of PEG 8000 and 185.0 gms. toluene are heated to azeotrope off any water, followed by transfer to a graduated addition funnel. 5.0 gms. (0.02 moles) of MDI in 40.0 gms. toluene are added to a reaction vessel which is heated to 50° C. The PEG solution is added for a period of one hour at 55° C., and the reaction proceeds for 1½ hours. This solution is added dropwise for a period of 1½ hours to 44.0 gms. (0.02 moles) of NP-40 Diol as used in Example 6, at a temperature of 60° to 65° C. After several days reaction at 58° C. the toluene is evaporated off to provide 138.5 gms. of product which is water soluble providing a 1% solution having a slight haze at room temperature and a cloud point of 74° C.

EXAMPLE 8

80.0 gms. (0.01 moles) PEG 8000 in 150.0 gms. toluene are azeotroped to remove any water, followed by cooling and adding to a feed graduate funnel, along with 40 gms. toluene rinse. 5.0 gms. (0.02 moles) of MDI in 65.0 gms. toluene are added to a reaction vessel along with one drop DBTD catalyst. The reaction mixture is heated to approximately 60° C. and the PEG solution is added dropwise. After one hour reaction, the mixture is transferred to another feed graduate funnel along with 40 gms. toluene rinse. 17.3 gms. (0.02 moles) of NP-10 Diol as used Example 3 in 85.0 gms. toluene are azeotroped to remove any water. The diol solution is cooled to 60° C. and two drops of DBTD catalyst is added along with the dropwise addition of PEG/MDI reaction mixture. The reaction proceeds overnight at 60° C. providing 103.6 gms. of product which is water soluble providing a 1% aqueous solution having a slight haze at room temperature and a cloud point of 60° C.

EXAMPLE 9

Following those procedures set forth in Example 8, but using the amounts of reactants shown in Table 2, 303.5 gms. of product are produced.

EXAMPLE 10

5.0 gms. (0.02 moles) of MDI in 35.0 gms. toluene are added to a reactor vessel followed by the dropwise addition of 17.3 gms. (0.02 moles) of NP-10 Diol as used in Example 8 in 25.0 gms. toluene, at 60° C. After one hour the reaction mixture is transferred to a graduated addition funnel. 80.0 gms. (0.01 mols) PEG 8000 in 217.0 gms. toluene are refluxed to azeotrope off water, followed by cooling to 60° C. The diol/MDI reaction mixture is added dropwise and the reaction is continued overnight at 56° C. The mixture is heated to 100° C. and one drop of DBTD catalyst is added. Following solvent evaporation, 102.3 gms. of product are provided.

EXAMPLES 11–30

These examples demonstrate reactions involving a variety of polyisocyanate, polyethylene glycol and hydrophobe reactants of varying proportions to provide polyurethane comb polymers of various molecular weight, HLB and molecular structure. Using those reactants set forth in Table 3, the following procedures produce polyurethane comb polymers varying in molecular weight, HLB and molecular structure, based on the previously described parameters a, b' and c, as identified in Table 3.

The experimental procedure involves charging the reaction vessel with the polyethylene glycol and hydrophobe reactant in toluene solvent. The mixture is brought to reflux to azeotropically remove any water present. The mixture is cooled to 60° and DBTD catalyst is added followed by the polyisocyanate. The reaction mixture becomes very viscous after a few hours. After stirring at 60° C. for approximately four days the toluene solvent is evaporated off at atmospheric conditions, to provide the polyurethane comb polymer.

TABLE 3

Examples 11–30

| Example | PEG | DIOL | DIISOCYANATE | b' | c | a/(b+c) | HLB | Molecular Weight |
|---|---|---|---|---|---|---|---|---|
| 11 | 3350(81.41) | NP-10(11.89) | TDI(6.70) | 2.4 | 8 | 0.95 | 18.00 | 49,378 |
| 12 | 3350(66.83) | NP-10(27.68) | TDI(5.50) | 2.4 | 8 | 0.95 | 18.29 | 60,154 |
| 13[1] | 8000(91.96) | NP-10(4.84) | TDI(3.19) | 2.8 | 23 | 0.98 | 19.09 | 352,883 |
| 14[1] | 8000(86.23) | NP-10(9.58) | TDI(4.18) | 1.8 | 37 | 0.99 | 18.63 | 284,631 |
| 15 | 14000(92.89) | NP-10(4.89) | TDI(2.22) | 1.9 | 11 | 0.95 | 19.29 | 165,448 |
| 16 | 3350(89.54) | C10(3.10) | TDI(7.36) | 2.4 | 8 | 0.95 | 18.12 | 44,898 |
| 17 | 3350(89.49) | C16(3.71) | TDI(6.79) | 2.7 | 7 | 0.95 | 18.07 | 48,662 |
| 18 | 8000(93.77) | C18(2.74) | TDI(3.49) | 2.1 | 8 | 0.94 | 18.87 | 78,204 |
| 19 | 3350(89.89) | NP(1.97) | MDI(8.13) | 4.9 | 7 | 0.97 | 18.10 | 99,377 |
| 20 | 3350(89.13) | NP(3.35) | IPDI(7.52) | 2.2 | 8 | 0.96 | 18.03 | 65,774 |
| 21 | 3350(89.03) | NP(4.21) | TDI(6.76) | 2.7 | 7 | 0.95 | 18.07 | 48,914 |
| 22 | 1000(65.16) | NP(15.67) | TDI(19.17) | 2.1 | 6 | 0.93 | 14.00 | 12,059 |
| 23 | 1000(78.65) | NP(5.78) | TDI(15.57) | 4.6 | 2 | 0.91 | 16.09 | 11,302 |
| 24 | 3350(93.73) | NP(0.91) | TDI(5.36) | 9.9 | 10 | 0.99 | 18.80 | 321,666 |
| 25 | 3350(88.60) | NP(5.18) | TDI(6.21) | 2.0 | 2 | 0.81 | 18.04 | 11,940 |
| 26 | 8000(96.07) | NP(1.18) | TDI(2.76) | 4.0 | 25 | 0.99 | 19.29 | 624,576 |
| 27 | 14000(96.22) | NP(1.65) | TDI(2.13) | 2.2 | 23 | 0.98 | 19.35 | 400,141 |
| 28 | 14000(97.16) | NP(1.10) | TDI(1.75) | 2.7 | 6 | 0.94 | 19.50 | 156,108 |
| 29 | 8000[2](80.00) | NP-40(17.03) | TDI(2.97) | 2.1 | 8 | 0.94 | 15.03 | 91,667 |
| 30 | 2025[3](54.95) | NP(37.65) | TDI(7.40) | 2.4 | 7 | 0.94 | 16.59 | 36,849 |

[1]based on PEG having a weight average molecular weight of 7,662.
[2]PEG copolymerized with 25% polypropylene glycol
[3]PEG copolymerized with 10% polypropylene glycol

TABLE 2

Examples 1–10

| | Reactants (gms) | | | | Product | |
|---|---|---|---|---|---|---|
| Example | PEG 8000 | DIOL[1] | MDI | Solvent[2] (gms) | (gms) | Cloud point (°C.) |
| 1 | 40 | 13.0 | 2.5 | 390 | 57.3 | ND |
| 2[2] | 80 | 26 | 5.0 | 300 | ND | ND |
| 3[2] | 111.5 | 12.2 | 5.0 | 240 | 132.3 | 84.2° |
| 4[2] | 111.5 | 12.2 | 5.0 | 297 | 133.0 | 90° |
| 5[3] | 99.6 | 10.8 | 5.0 | 235 | 124.9 | ND |
| 6[3] | 99.6 | 27.5 | 5.0 | 265 | 129.9 | 68° |
| 7[2] | 80 | 44 | 5.0 | 385 | 138.5 | 74° |
| 8[2] | 80 | 17.3 | 5.0 | 300 | 103.6 | 60° |
| 9[2] | 240 | 51.9 | 15.0 | 505 | 303.5 | ND |
| 10[2] | 80 | 17.3 | 5.0 | 277 | 102.3 | ND |

ND — not determined
[1]Examples 1, 6 and 7 use NP-40 Diol having a weight average molecular weight of 2,548, as the hydrophobe reactant. All other examples pertain to NP-10 Diol as hydrophobe reactant having a weight average molecular weight of 862, except Example 2 which is based on NP-10 Diol ethoxylated to a weight average molecular weight of 2,151.
[2]Using 1 drop DBTD catalyst
[3]Using 2 drops DBTD catalyst

EXAMPLES 31–38

These examples demonstrate procedures for producing polyurethane comb polymers derived from grafting hydrophobe reactants onto polyethylene glycol followed by reaction with polyisocyanate. Examples 31–33 describe grafting procedures while Examples 34–38 describe the production of polyurethanes.

EXAMPLES 31–33

Using the amount of reactants and catalysts set forth in Table 4, PEG 14,000 is grafted with hexadecene to provide 3, 5 and 7 weight percent hexadecyl grafts on the PEG product. The procedure entails charging the PEG to a reactor vessel followed by addition of hexadecene and di-t-butyl peroxide catalyst. The reaction proceeds for 5 hours at from 140° to 150° C. with stirring.

TABLE 4

Examples 31–33

| | Reactants (gms) | | Catalyst |
|---|---|---|---|
| Example | PEG 14,000 | Hexadecene (wt. %) | (gms) |
| 31 | 291.0 | 9.0 (3%) | 0.6 |
| 32 | 285 | 15.0 (5%) | 1.0 |

TABLE 4-continued

| | Examples 31-33 | | |
| | Reactants (gms) | | Catalyst |
| Example | PEG 14,000 | Hexadecene (wt. %) | (gms) |
| 33 | 279 | 21 (7%) | 1.4 |

EXAMPLES 34-38

Polyurethanes are produced by charging 150 gms. of PEG 14,000 and 400 gms. toluene to a reaction vessel. The vessel is refluxed to azeotrope off all water. After cooling to 60° C., 0.12 gms. of DBTD catalyst and 1.8 gms. TDI are added. The reaction mixture is stirred at approximately 60° C. for several days. The evaporation of the toluene solvent provides a product having a 2.5% aqueous viscosity as indicated in Table 5. Example 38 provides a control identical to the products of Examples 34-37 but using a nongrafted PEG 14,000.

TABLE 5

| | Examples 34-38 | | |
| | Reactants | | |
| Example | PEG 14,000 Example # | Hydrophobe wt. % | Brookfield Viscosity of 2.5% Aqueous Solution (cps) |
| 34 | 31 | 3% | 740 |
| 35 | 32 | 5% | 320 |
| 36 | 33 | 7% | ND |
| 37[1] | 33 | 7% | 54,320 |
| 38 | — | 0% | 17.5 |

ND - not determined
[1] - based on 65 gms. of 7% grafted PEG 14,000 and 85 gms. of nongrafted PEG 14,000. with 1.9 gms. TDI.

EXAMPLES 39-41

These examples provide a comparison between polyurethane comb polymers of the present invention and similar polyurethanes which do not contain the hydrophobe component. Examples 39 and 40 pertain to the polyurethane comb polymers of Examples 13 and 14 respectively. Example 41 pertains to a polyurethane which is the reaction product of 196.09 gms. (0.0222 moles) of PEG 8000, having a weight average molecular weight of 8,844, reacted with 3.91 gms. (0.0225 moles) TDI, using 0.30 gms. phenyl mercuric acetate catalyst, for one hour at 85° C. and continued overnight at approximately 70° C.

TABLE 6

| | Examples 39-41 | |
| Example | Polyurethane | 2% Brookfield Viscosity |
| 39 | Example 13 | 44 |
| 40 | Example 14 | 184 |
| 41 | Control[1] | 14 |

[1] - PEG 8000/TDI polyurethane having a calculated weight average molecular weight of approximately 670,000

What is claimed is:

1. A comb polymer comprising a water-soluble polyurethane containing the repeating units:

$$-X_{a'}-, -Y_b- \text{ and } -(-X-)_m-Z_c-$$

wherein:
X is the residue of an organic polyisocyanate;
Y is the residue of a polyethylene glycol homopolymer or copolymer with up to 50 mole percent $C_3$ to $C_5$ polyoxyalkylene, or the monomeric equivalent of said polyethylene glycol;
Z is the residue of a hydrophobe reactant containing a monovalent hydrophobic group providing a molar volume contribution of at least about 130 cc/mole;
b is at least about 2;
c is at least about 2;
m is 0 or 1;
a' is such that $$\frac{a' + mc}{b + c}$$

is between about 0.50 to about 1.25 and sufficient to provide a polymer molecular weight of at least about 10,000; and wherein:
(1) the polymer has at least one Z unit separated from each end of the polymer by at least one X unit; and
(2) the hydrophilic/lipophilic balance of the polymer is between about 14 to about 19.5.

2. The polymer of claim 1 wherein said polyisocyanate has the structure:

$$O=C=N-R_1-N=C=O$$

wherein $R_1$ is an alkylene, cycloalkylene or arylene.

3. The polymer of claim 2 wherein said polyisocyanate is toluene diisocyanate, methylene dianiline diisocyanate or isophorone diisocyanate.

4. The polymer of claim 1 wherein said polyethylene glycol is a homopolymer having a molecular weight of up to about 14,000.

5. The polymer of claim 1 wherein the molar volume contribution of said monovalent hydrophobic group is at least about 190 cc/mole.

6. The polymer of claim 1 wherein said monovalent hydrophobic group is an unsubstituted or halo substituted hydrocarbon radical having at least 8 carbon atoms.

7. The polymer of claim 6 wherein said hydrocarbon radical has at least 12 carbon atoms.

8. The polymer of claim 7 wherein said hydrocarbon radical is an alkyl or aralkyl having from about 14 to about 16 carbon atoms.

9. The polymer of claim 8 wherein the said hydrocarbon radical is nonylphenyl, n-tetradecyl or n-hexadecyl.

10. The polymer of claim 1 wherein said polyurethane has terminal hydroxyl groups.

11. The polymer of claim 1 wherein m is 1 and said polyurethane has the formula:

$$HO[(Y-X)_{b'}Z-X]_cY-OH$$

wherein
b' is the average number of polyethylene glycol residues per hydrophobe residue; and
c, X, Y and Z are as defined previously.

12. The polymer of claim 1 wherein m is 0 and said polyurethane has the formula:

$$HO[(Y_1Z_{c'}Y_2)_{b-1}X]_aY-OH$$

wherein
a, b, X and Z are as defined previously
c' is the average number of monovalent hydrophobic group per polyethylene glycol repeating unit; and Y₁ and Y₂ are the residues of said polyethylene glycol or monomeric equivalent reacted with said hydrophobe reactant.

13. An aqueous solution containing an effective thickening amount of the polymer of claim 1.

14. A process for producing a comb polymer which is a water-soluble polyurethane, which comprises reacting:
(a) a moles of an organic polyisocyanate;
(b) b moles of a polyethylene glycol homopolymer or copolymer with up to 50 mole percent $C_3$ to $C_5$ polyoxyalkylene or the monomeric equivalent of said polyethylene glycol; and
(c) c moles of a hydrophobe reactant containing a monovalent hydrophobic group providing a molar volume contribution of at least about 130 cc/mole wherein:
b is at least about 2;
c is at least about 2; and
a is such that

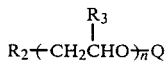

is between about 0.50 to about 1.25 and sufficient to provide a polymer molecular weight of at least about 10,000;
(d) in a manner sufficient to produce said polymer with (1) at least one monovalent hydrophobic group separated from each end of the polymer by at least one polyethylene glycol residue, and (2) a hydrophilic/lipophilic balance of between about 14 to about 19.5.

15. The process of claim 14 wherein said organic polyisocyanate, polyethylene glycol and hydrophobe reactant are reacted simultaneously.

16. The process of claim 14 wherein said hydrophobe reactant has the formula:

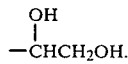

wherein;
n is from 0 to about 40;
$R_2$ is said monovalent hydrophobic group; each $R_3$ is individually hydrogen or $C_1$ to $C_3$ alkyl; and
Q is a functional group reactive with said polyisocyanate or polyethylene glycol.

17. The process of claim 16 wherein n is 0.

18. The process of claim 16 wherein Q is an alkylene glycol radical or alkenyl radical.

19. The process of claim 18 wherein Q is $$\begin{array}{c} \text{OH} \\ | \\ -\text{CHCH}_2\text{OH}. \end{array}$$

20. The process of claim 18 wherein Q is $-CH=CH_2$.

21. The process of claim 19 which comprises:
(1) reacting a molar excess of said polyisocyanate with said polyethylene glycol to produce a polyethylene glycol diisocyanate intermediate having the formula

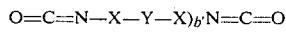

wherein b' is the average number of polyethylene glycol residues per molecule, X is the residue of said polyisocyanate and Y is the residue of said polyethylene glycol; followed by
(2) reacting said polyethylene glycol intermediate with said hydrophobe reactant to produce said polyurethane having the repeating structure:

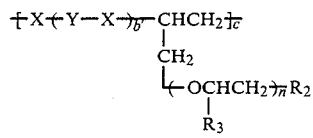

wherein b', c, n, $R_2$, $R_3$, X and Y are as defined previously.

22. The process of claim 19 which comprises:
(1) reacting a molar excess of said polyisocyanate with said hydrophobe reactant to produce a hydrophobe diisocyanate intermediate having the formula:

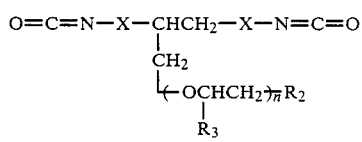

wherein:
n, $R_2$ and $R_3$ are as defined previously; and
X is the residue of said polyisocyanate; followed by
(2) reacting said hydrophobe diisocyanate intermediate with said polyethylene glycol to produce said polyurethane having the repeating structure as in claim 21.

23. The process of claim 19 which comprises:
(1) reacting said hydrophobic reactant with (a) said polyethylene glycol or (b) its monomeric equivalent comprised of sufficient moles of at least one oxyalkylene glycol of the formula:

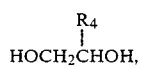

wherein $R_4$ is hydrogen or $C_1$ to $C_3$ alkyl, to produce b moles a diol intermediate having the formula:

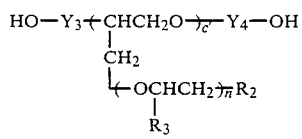

wherein:
c' is the average number of monovalent hydrophobic groups per diol intermediate;
n, $R_2$ and $R_3$ are as defined previously; and
$Y_3$ and $Y_4$ are the residue of said polyethylene glycol or oxyalkylene reaction; followed by
(2) reacting said diol intermediate with said polyisocyanate to produce said polyurethane having the repeating structure

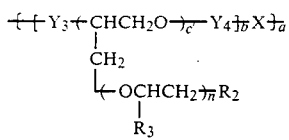

wherein a, b, c′, n, $R_2$, $R_3$, X, $Y_3$ and $Y_4$ are as defined previously.

24. The process of claim 20 which comprises:

(1) grafting said hydrophobe reactant onto said polyethylene glycol to produce a diol intermediate having the formula:

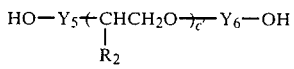

wherein:

$R_2$ is as defined previously;

c′ is the average number of grafts containing said monovalent hydrophobic group; and $Y_5$ and $Y_6$ are the residue of the polyethylene glycol; followed by (2) reacting said diol intermediate with said polyisocyanate to produce said polyurethane having the repeating structure

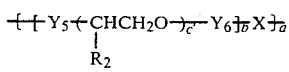

wherein a, b, c′, $R_2$, X, $Y_5$ and $Y_6$ are as defined previously.

* * * * *

UNITED STATES PATENT AND TRADEMARK OFFICE
CERTIFICATE OF CORRECTION

PATENT NO. : 4,496,708
DATED : January 29, 1985
INVENTOR(S) : David C. Dehm, et al.

It is certified that error appears in the above-identified patent and that said Letters Patent is hereby corrected as shown below:

Column 7, line 48 in Formula (II) change "Y-X)$_{b-1}$Z" to --Y-X$)_b$Z--.

Column 10, line 32 in Formula (VII) change "N-X-Y)$_b$·X" to --N(X-Y$)_b$X--.

Column 12, line 66 in the NP Diol formula change "$C_9H_{19}$⌬O(C" to --$C_9H_{19}$⌬O(C--.

Column 13, line 5 in the NP-10 Diol formula change "$C_9H_{19}$⌬O(C" to --$C_9H_{19}$⌬O(C--.

Column 13, line 11 in the NP-40 Diol formula change "$C_9H_{19}$⌬O(C" to --$C_9H_{19}$⌬O(C--.

Claim 21, line 6 in the formula in step (1) change "X-Y-X)$_b$·N" to --X(Y-X$)_b$N--.

Signed and Sealed this

Seventh Day of May 1985

[SEAL]

Attest:

DONALD J. QUIGG

*Attesting Officer*   *Acting Commissioner of Patents and Trademarks*